(12) United States Patent
Usukura (10) Patent No.: US 6,318,820 B1
(45) Date of Patent: *Nov. 20, 2001

(54) ANTILOCK CONTROL METHOD

(75) Inventor: Kazuhiro Usukura, Saitama (JP)

(73) Assignee: Akebono Brake Industry Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,547

(22) Filed: Nov. 19, 1998

(30) Foreign Application Priority Data

Nov. 21, 1997 (JP) .................................. 9-320986

(51) Int. Cl.$^7$ ...................................... B60T 8/58
(52) U.S. Cl. .......................................... 303/149; 303/157
(58) Field of Search ................... 303/148–150, 303/157, 158, 186, 188, 189

(56) References Cited

U.S. PATENT DOCUMENTS

| | | | |
|---|---|---|---|
| 4,288,127 | * | 9/1981 | Leiber et al. ........................ 303/111 |
| 4,489,382 | * | 12/1984 | Jonner et al. ........................ 364/426 |
| 4,593,955 | * | 6/1986 | Leiber ................................. 303/106 |
| 4,739,484 | * | 4/1988 | Fennel ................................ 364/426 |
| 5,058,018 | * | 10/1991 | Kuwana et al. ................. 364/426.02 |
| 5,224,766 | * | 7/1993 | Oikawa et al. ...................... 303/100 |
| 5,271,666 | * | 12/1993 | Okubo .................................. 303/96 |
| 5,286,100 | * | 2/1994 | Takayama et al. .................. 303/111 |
| 5,315,518 | * | 5/1994 | Lin ................................. 364/426.02 |
| 5,498,071 | * | 3/1996 | Oikawa et al. ...................... 303/149 |
| 5,520,448 | * | 5/1996 | Okubo .................................. 303/148 |
| 5,551,769 | * | 9/1996 | Luckevich .......................... 303/149 |
| 6,044,319 | * | 3/2000 | Rosendahl et al. ................... 701/71 |

* cited by examiner

Primary Examiner—Robert J. Oberlietner
Assistant Examiner—Bradley King
(74) Attorney, Agent, or Firm—Morgan, Lewis & Bockius LLP (57) ABSTRACT

An antilock control method wherein during the running of an automotive vehicle on a road surface ($\mu$-split surface) having a different coefficient of friction where one of the right and left wheels of the same axle is on a road surface of the higher coefficient of friction and the other one of the wheels is on a road surface of the lower coefficient of friction, when the brake is operated and an antilock control starts, the wheel that runs on the road surface having the lower coefficient of friction excessively slips in a first cycle of the antilock control, and a predetermined condition is satisfied, 1) a hydraulic braking pressure to the wheel that runs on the road surface having the higher coefficient of friction is progressively decreased during progressively decreasing periods of time, and 2) after the pressure decreasing, another predetermined condition is satisfied, a gentle increasing of the hydraulic braking pressure to the wheel that runs on the road surface having the higher coefficient of friction starts, whereby the road surface having the higher coefficient of friction is efficiently utilized, thereby eliminating insufficient deceleration of the vehicle body.

3 Claims, 6 Drawing Sheets

ANTILOCK CONTROL METHOD

BACKGROUND OF THE INVENTION

The present invention relates to an antilock control method in which during the running of an automotive vehicle on a road surface ($\mu$-split surface) having a different coefficient of friction where one of the right and left wheels of the same axle is on a road surface of the higher coefficient of friction and the other one of the wheels is on a road surface of the lower coefficient of friction, when the brake is operated and an antilock control starts, the braking force difference between the right and left front-wheels is reduced, thereby improving the vehicle stability and making the steering maneuver by the driver easy.

When the running vehicle abruptly brakes, the wheel of the vehicle is locked and skids since there is a limit of frictional force between the wheel and the road surface.

For the means to prevent the wheel locking phenomenon, there has been known a conventional antilock control system which controls a slip rate of the wheel on the road surface so as to be constant.

In the vehicle equipped with the antilock control system, when one of the wheels of the same axle runs on the surface having the lower coefficient of friction (referred to as a low-$\mu$ load surface), e.g., an ice road surface, if the wheels are controlled so that the slip rate of one of those wheels is equal to that of the other one, a braking force to the wheel on the road surface having the higher coefficient of friction (referred to as a high-$\mu$ road surface) becomes larger than that of the wheel on the low-$\mu$ load surface, so that the vehicle possibly spins. Particularly in those vehicles, e.g., the short-wheel base vehicle, the high gravity-center vehicle, the vehicle having a large scrub radius, the vehicle will more easily spin.

The solution to this problem is proposed: when the wheel on the low u road surface (select low) is locked, the hydraulic braking pressure to the wheel on the high $\mu$ road surface (referred to frequently as a "high $\mu$ road side wheel") is forcibly decreased in accordance with the hydraulic braking pressure to the wheel on the low $\mu$ road surface (referred to frequently as a low $\mu$ road side wheel) (select low), as disclosed in Japanese Patent Laid-Open Publication No. Sho. 63-170154.

The proposed solution in which the brake pressure to the high $\mu$ road side wheel is controlled with respect to a state of the low $\mu$ road side wheel (select low), has the following problem, however. When the low $\mu$ road side wheel (select low) slips, the hydraulic braking pressure to the high $\mu$ road side wheel is also forcibly reduced in synchronism with the slippage. Therefore, it is impossible to efficiently utilize the braking force to the wheel on the high $\mu$ road side wheel. In other words, an efficiency of the utilization of the road surface on which the high $\mu$ road side wheel runs is reduced, so that the stopping distance is long.

SUMMARY OF THE INVENTION

Accordingly, an object of the present invention is to provide an antilock control method which efficiently utilizes the high $\mu$ road surface, thereby eliminating the insufficient deceleration of the vehicle body.

To achieve the above object, there is provided an antilock control method wherein during the running of an automotive vehicle on a road surface ($\mu$-split surface) having a different coefficient of friction where one of the right and left wheels of the same axle is on a road surface of the higher coefficient of friction and the other one of the wheels is on a road surface of the lower coefficient of friction, when the brake is operated and the decreasing of the brake pressure to the right and left wheels starts, and the wheel that runs on the road surface having the lower coefficient of friction excessively slips, 1) a forcible pressure-decreasing time of the wheel that runs on the road surface having the higher coefficient of friction is progressively changed every period within a first cycle of the antilock control (ranging from a pressure decreasing to the next pressure decreasing), to thereby reduce an excessive pressure decrease, and
2) when a hold mode that follows the end of the forcible pressure-decrease control to the wheel that runs on the road surface having the higher coefficient of friction continues for a time over a predetermined time, a gentle pressure increase control starts (the start of the gentle pressure increase control is quickened).

The antilock control method of the invention controls the hydraulic braking pressure to the wheel on the high $\mu$ road surface while monitoring the hydraulic braking pressure to the wheel on the low $\mu$ road surface. Therefore, the antilock control method can efficiently utilize the braking force to the wheel on the high $\mu$ road surface without any influence on the braking operations of the wheels running on a roadway having a uniform wheel to road condition, and can secure a vehicle stability in the initial braking stage on the $\mu$-split surface.

According to the present invention, there is provided an antilock control method wherein during the running of an automotive vehicle on a road surface ($\mu$-split surface) having a different coefficient of friction where one of the right and left wheels of the same axle is on a road surface of the higher coefficient of friction and the other one of the wheels is on a road surface of the lower coefficient of friction, when the brake is operated and an antilock control starts, the wheel that runs on the road surface having the lower coefficient of friction excessively slips in a first cycle of the antilock control, and a predetermined condition is satisfied, 1) a hydraulic braking pressure to the wheel that runs on the road surface having the higher coefficient of friction is progressively decreased every period while changing a forcible pressure-decreasing time, and
2) after the pressure decreasing, another predetermined condition is satisfied, a gentle increasing of the hydraulic braking pressure to the wheel that runs on the road surface having the higher coefficient of friction starts, whereby the road surface having the higher coefficient of friction is efficiently utilized, thereby eliminating the insufficient deceleration of the vehicle body.

DESCRIPTION OF THE PREFERRED EMBODIMENTS

Figure 1:
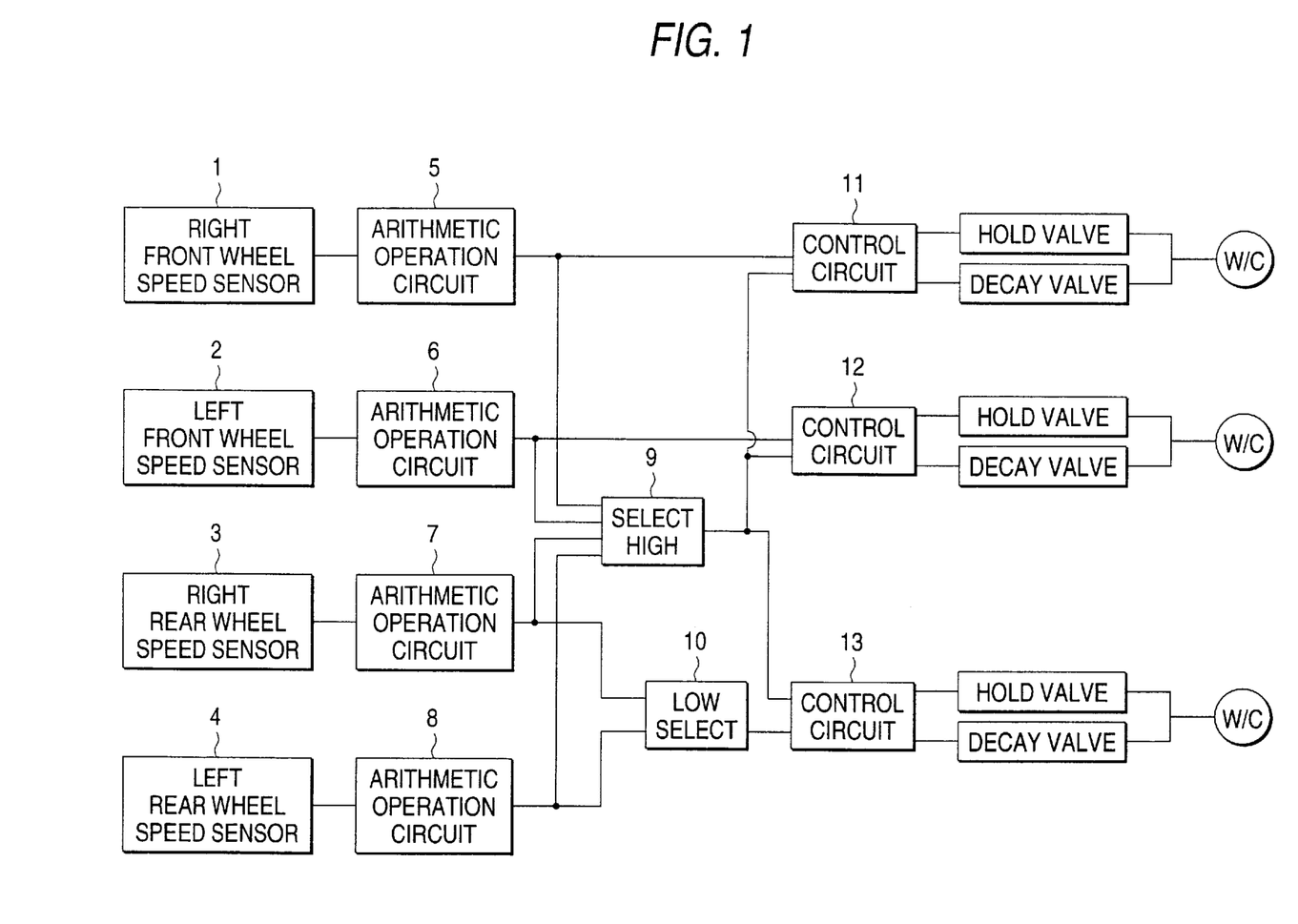
FIG. 1 is a block diagram showing an antilock control system which is an embodiment of the present invention.
Figure 2:
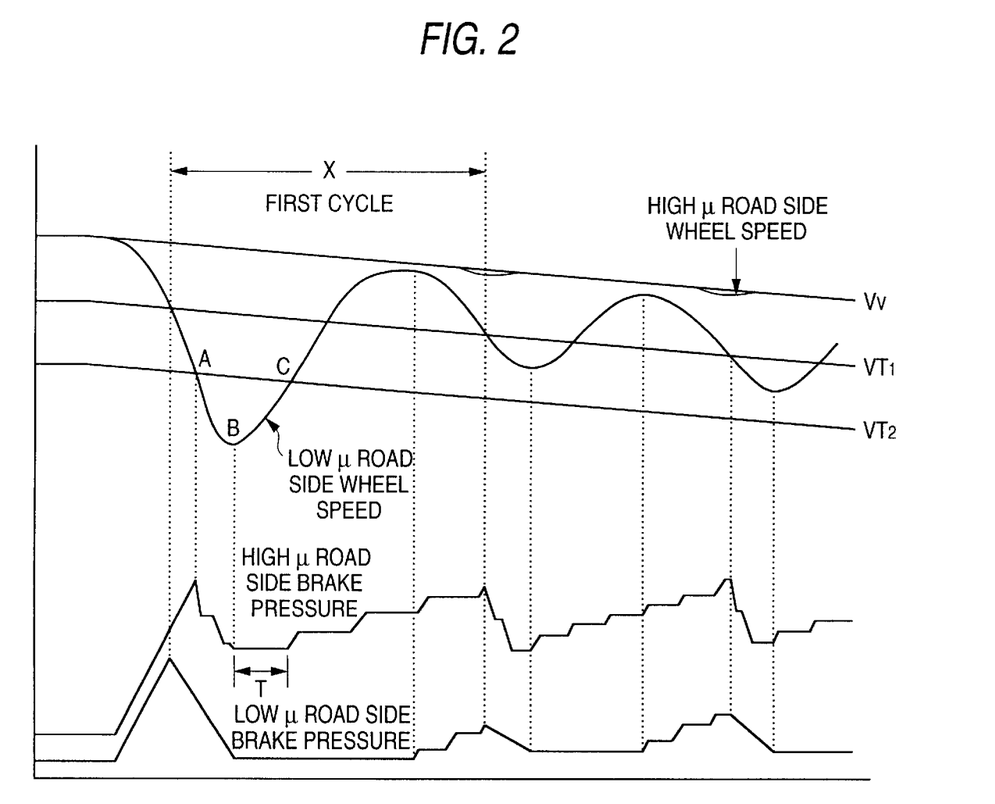
FIG. 2 is a graph showing variations of hydraulic braking pressures to the wheel that runs on the low and high $\mu$ road surfaces when the antilock control of the invention is performed, with respect to wheel speed.
Figure 3:
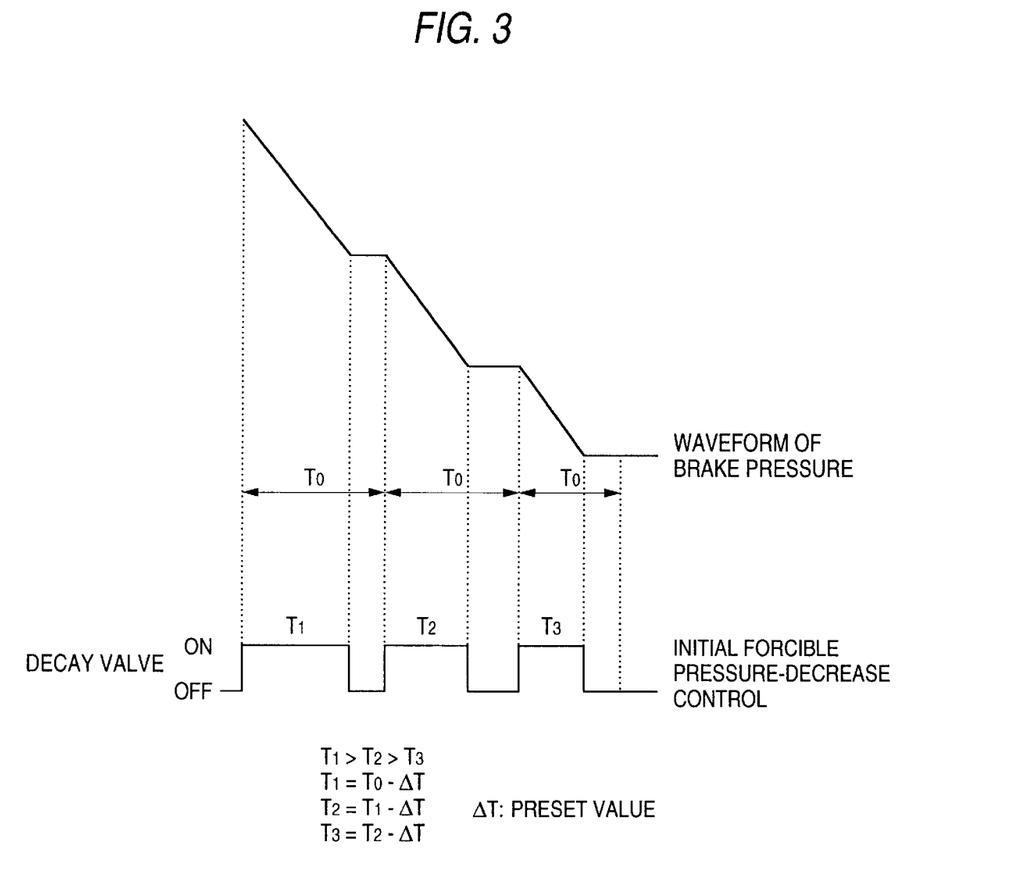
FIG. 3 is a graph useful in explaining how to decrease the hydraulic braking pressure to the wheel running on the high $\mu$ road surface.
Figure 4:
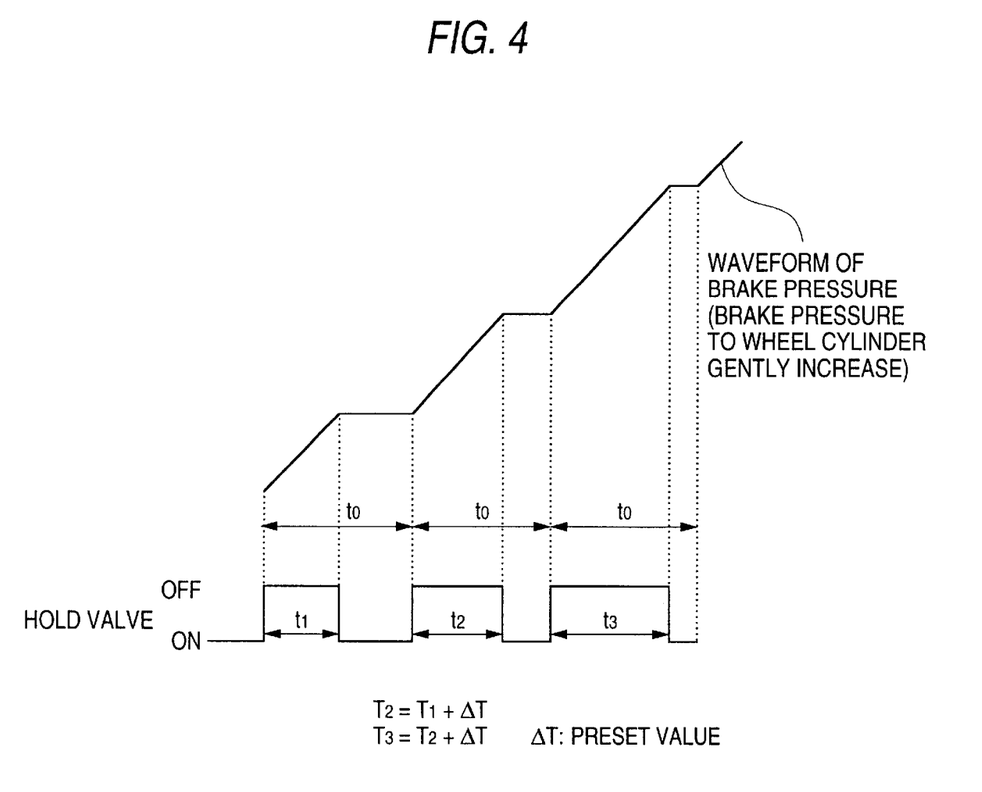
FIG. 4 is a graph useful in explaining how to gently increase the hydraulic braking pressure to the wheel running on the high $\mu$ road surface.
Figure 5:
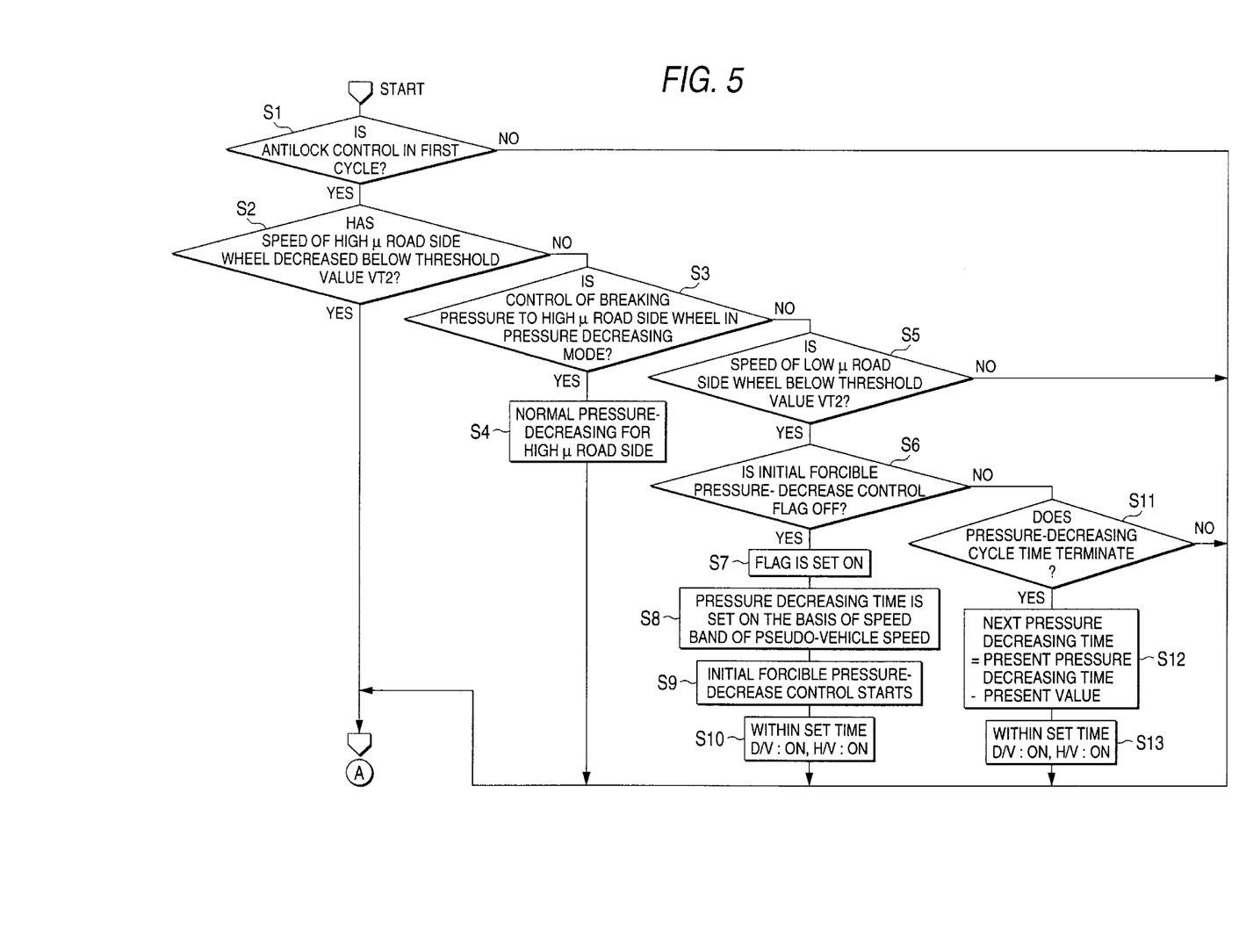
FIG. 5 is a flow chart showing a forcible pressure-decrease control in the antilock control method which is an embodiment of the present invention.
Figure 6:
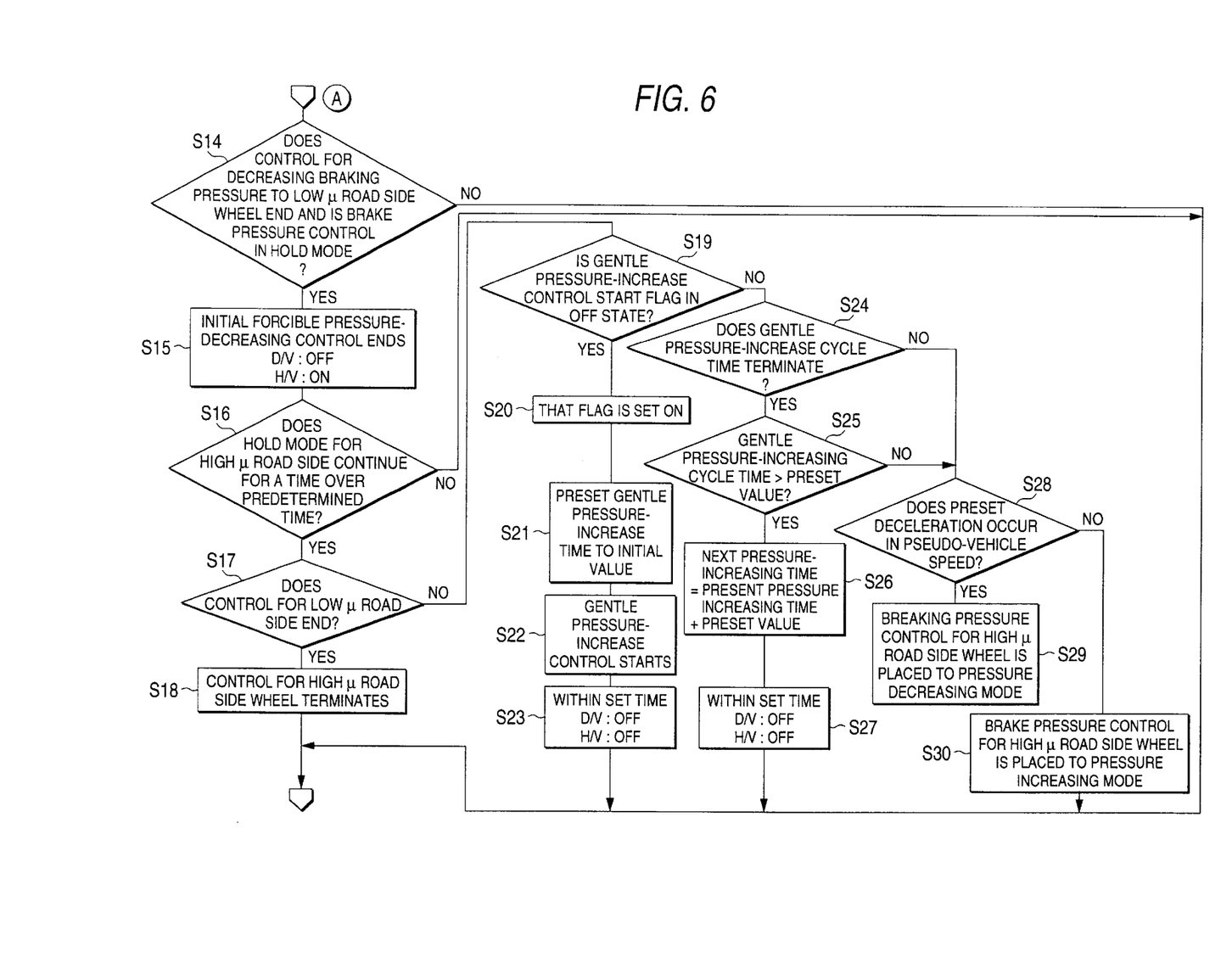
FIG. 6 is a flow chart showing a gentle pressure increase control in the antilock control method which is an embodiment of the present invention.

The preferred embodiment of the present invention will be described with reference to the accompanying drawings. FIG. 1 is a block diagram showing an antilock control system (3-channel brake control system (the front wheels are brake controlled independently and the rear wheels are brake controlled commonly), which is an embodiment of the present invention. FIG. 2 is a graph showing variations of hydraulic braking pressures to the wheel that runs on the low and high $\mu$ road surfaces when the antilock control of the invention is performed, with respect to wheel speed. FIG. 3 is a graph useful in explaining how to decrease the hydraulic braking pressure to the wheel running on the high $\mu$ road surface. FIG. 4 is a graph useful in explaining how to gently increase the hydraulic braking pressure to the wheel running on the high $\mu$ road surface. FIGS. 5 and 6 cooperate to show a flow chart of an antilock control method which is an embodiment of the present invention.

The antilock control method may be applied to the antilock control systems of type of 4-sensor/4-channel and 4-sensor/3-channel (front dependent control).

In FIG. 1, reference numeral 1 is a right front-wheel speed sensor; 2 is a left front-wheel speed sensor; 3 is a right rear-wheel speed sensor; and 4 is a left rear-wheel speed sensor. The signals as frequency signals output from those wheel speed sensors 1 to 4 are respectively sent to arithmetic operation circuits 5 to 8 which in turn mathematically process those received signals and produce wheel speed signals. Of the wheel speed signals output from the arithmetic operation circuits 5 to 8, a signal indicative of the highest wheel speed is selected by a select high 9. Of the right and left rear-wheel speeds output from the arithmetic operation circuits 7 and 8, a signal indicative of the lowest wheel speed is selected by a low select 10. The output signal of the low select 10, and the output signals of the arithmetic operation circuits 5 and 6 are input to control circuits 13, and 11 and 12 by way of signal transmission paths illustrated.

The control circuits 11 to 13 control, in an antilock control mode, the on/off operations of hold valves HV and decay valves DV in conventional manners in accordance with the signals received.

When the automotive vehicle runs on a $\mu$-split surface and its wheel running on the low $\mu$ road surface greatly slips in the initial stage of the antilock control, the antilock control method of the invention varies, every predetermined time period, a forcible pressure decreasing time of the wheel running on the high $\mu$ road surface to thereby suppress an excessive pressure decrease, and quickens a gentle pressure increase of the hydraulic braking pressure to the brake of the wheel on the high $\mu$ road surface whereby the high $\mu$ road surface is efficiently utilized and hence the insufficient deceleration problem is removed (this will be described later).

The antilock control of the invention is substantially the same as that executed by the conventional antilock control system except the contents of the arithmetic operations performed by the control circuits 11 to 13. Description to follow will be made placing emphasis on the control (referred to as an "antilock control procedure") executed by the control circuits. Circuits for executing the antilock control procedure may be provided in those control circuits 11 to 13. In an alternative, those circuits are separately formed in advance and connected to the control circuits conventionally used.

The antilock control procedure executed by the control circuits will now be described. During the running of an automotive vehicle on a $\mu$-split surface, the antilock control procedure starts the braking of the wheels of the vehicle, and executes special controls (initial pressure-decrease control and a gentle pressure-increase control), which is different from a normal control. In those controls, one (running on the high $\mu$ road surface) of the right and left front-wheels is controlled in accordance with a control state of the other one (running on the low $\mu$ road surface) of the right and left front-wheels.

Reference is made to FIGS. 2 to 4.

(1) An initial forcible pressure-decrease control for the wheel (high $\mu$ road side wheel) on the high $\mu$ road surface starts provided that the following conditions a) to d) all hold:

a) the antilock control is in its first cycle (denoted as X in FIG. 2),
   b) the high $\mu$ road side wheel is not in a pressure decreasing mode,
   c) the speed of the high $\mu$ road side wheel have never decreased to below a predetermined threshold value VT2 (having a profile resembling a profile representing a pseudo-vehicle speed Vv) shown in FIG. 2, and
   d) the speed of the low $\mu$ road side wheel is below the threshold value VT2 and that wheel is in a pressure decreasing mode.

(2) The initial forcible pressure-decrease control for the high $\mu$ road side wheel ends provided that either of the following conditions e) and f) holds:

e) the pressure decreasing mode of the low $\mu$ road side wheel terminates, and
   f) the high $\mu$ road side wheel is placed to the pressure decreasing mode.

Where the conditions for 1) above are satisfied, the initial forcible pressure-decrease control for the high $\mu$ road side wheel is performed in the following:

g) when the speed of the low $\mu$ road side wheel is below the threshold value VT2 (at point A in FIG. 2), the high $\mu$ road side wheel is subjected to the initial forcible pressure-decrease,
   h) the initial forcible pressure decreasing rate is set in accordance with a speed band of the pseudo-vehicle speed Vv,
   i) a set value is subtracted from an initial set value every pressure decreasing cycle, whereby an excessive pressure decrease of the hydraulic braking pressure to the high $\mu$ road side wheel is suppressed (the pressure decreasing time is progressively reduced within a fixed time as shown in FIG. 3),
   j) when the speed of the low $\mu$ road side wheel reaches a low peak (point B in FIG. 2), the initial forcible pressure-decrease control for the high $\mu$ road side wheel is terminated, and
   k) if the brake pressure control to the low $\mu$ road side wheel is in a hold mode after the speed of the low $\mu$ road side wheel reaches the low peak, the brake pressure control to the high $\mu$ road side wheel is also placed to the hold mode.

When the high $\mu$ road side wheel is under the brake pressure control stated above, the low $\mu$ road side wheel slips earlier than the high $\mu$ road side wheel and is subjected to the brake pressure control in the brake pressure control for the low μ road side wheel. Therefore, the normal control is performed.

A gentle pressure-increase control for the high μ road side wheel in the "antilock control procedure" follows:

(1) The gentle pressure-increase control for the high μ road side wheel starts provided that the following conditions l) and m) hold:
 l) a predetermined time (T in FIG. 2) elapses in a state that the high μ road side wheel is in the hold mode following the end of the forcible pressure-decrease control, and
 m) a pressure increasing mode is set up for the low μ road side wheel within the predetermined time T.

(2) The gentle pressure-increase control ends provided that either of the following conditions n) and o) holds:
 n) after the gentle pressure-increase control starts, a gentle pressure-increasing time exceeds a preset value (limiter), viz., the gentle pressure-increasing time in the present gentle pressure-increase control exceeds a limiter, and
 o) a deceleration of the pseudo-vehicle speed Vv exceeds its deceleration when the speed Vv exceeds the threshold value VT2 (at point C in FIG. 2) after the first control cycle for the low μ road side wheel in the pressure decreasing control ends.

The gentle pressure-increase control for the high μ road side wheel is as follows:

p) when the speed of the low μ road side wheel reaches a low peak (point B in FIG. 2), the initial forcible pressure-decrease control is terminated, and the high μ road side wheel is placed to the hold mode in harmony with the control mode of the low μ road side wheel.

q) this hold mode is executed only for the predetermined time T.

r) in the gentle pressure-increase control, the pressure increasing rate is progressively increased by a preset value (as shown in FIG. 4, a pressure increasing time is progressively increased as indicated by t1, t2 and t3, within a fixed time t0).

s) the gentle pressure-increase control is terminated when the pressure increasing rate that is changed every period or fixed time exceeds a preset value (limier) or when a deceleration of the pseudo-vehicle speed reaches a preset value, t) when the split judgement is continued after the gentle pressure-increase control ends, a conventional yaw moment control is executed.

When the high μ road side wheel is under the above control, the hydraulic braking pressure to the low μ road side wheel is controlled in a normal manner in linking with the slipping of the wheel.

The "antilock control procedure" thus performed will be described with reference with control flows charted in FIGS. 5 and 6. FIG. 5 is a flowchart showing a control flow of the forcible pressure-decrease control for the high μ road side wheel, and FIG. 6 is a flow chart showing a control flow of the gentle pressure-increase control for the same. Those controls shown in FIGS. 5 and 6 are described in a continuous program.

Reference is made to FIG. 5. Upon start of the control program for the forcible pressure-decrease control for the high μ road side wheel (viz., decremental control of the hydraulic braking pressure to the high μ road side wheel), a step S1 of the control program is executed to judge whether or not the antilock control is in the first cycle (X in FIG. 2).

If the answer is YES (the antilock control is in the first cycle), a step S2 is executed to judge whether or not the speed of the high μ road side wheel has decreased to below the threshold value VT2. Immediately after the present control is initiated, the speed of the high μ road side wheel has never gone to below the threshold value VT2, viz., the answer is NO. Therefore, the next step S3 is executed to judge whether or not the control of the hydraulic braking pressure to the high μ road side wheel is in a pressure decreasing mode.

If the control of the hydraulic braking pressure to the high μ road side wheel is not in a pressure decreasing mode, viz., the answer is NO, a forcible pressure-decrease control mode to be described below is executed.

A step S5 is executed to judge whether or not the speed of the low μ road side wheel is below the threshold value VT2 and the pressure control to the same wheel is in the pressure decreasing mode.

If the pressure control to the high μ road side wheel is in the pressure decreasing mode, viz., the answer is YES, a step S6 is executed to judge if an initial forcible pressure-decrease control flag is OFF. If it is OFF, a step S7 is executed to set the flag ON. And the next step S8 is executed to set a pressure decreasing time T1 on the basis of a speed band of the pseudo-vehicle speed Vv at that time. The pressure decreasing time T1 is expressed as a function of the pseudo-vehicle speed Vv as given by the equation (1)

$$T1=f(Vv) \tag{1}$$

Then, a step S9 is executed to start the initial forcible pressure-decrease control for the high μ road side wheel.

A step S10 is executed to execute a first pressure decreasing (turn on the decay valve and the hold valve) within the pressure decreasing time or set time T1.

When the step S10 ends in its execution and the forcible pressure-decrease control needs to be continued, the "antilock control procedure" returns to the start of this program, and the steps S1, S2, S3 and S5 are executed and the step S6 is executed. The answer to the step S6 is NO (the flag is ON), and then a step S11 is executed to judge if a pressure-decreasing cycle time T0 (FIG. 3) terminates. The pressure-decreasing cycle time T0 is set in advance.

If the pressure-decreasing cycle time T0 terminated, a step S12 is executed to calculate the next pressure decreasing time T2 by use of the following equation (2).

$$\text{Next pressure decreasing time T2=present pressure decreasing time T1-preset value } (\Delta T) \tag{2}$$

A step S13 is executed to turn on the decay valve and hold valve within the preset time and to execute the pressure decreasing.

This will be further described. As shown in FIG. 3, the ON time of the decay valve and that of the hold valve are progressively reduced within the pressure-decreasing cycle time T0.

If the answer is YES (the speed of the high μ road side wheel has decreased to below the threshold value VT2), there is no need of applying the forcible pressure-decrease control to the high μ road side wheel, and hence the "antilock control procedure" enters the control phase depicted by the flow chart of FIG. 6. If the control of the hydraulic braking pressure to the high μ road side wheel is in a pressure decreasing mode in the step S3, the FIG. 5 control is stopped and a step S4 is executed to decreases the hydraulic braking pressure to the high μ road side wheel in a normal manner. If the speed of the low μ road side wheel is below the threshold value VT2 and the pressure control to the same wheel is not in the pressure decreasing mode (step S5), or if the pressure-decreasing cycle time T0 (FIG. 3) is not yet terminated (step S11), the "antilock control procedure" returns to the start of the program.

After the forcible pressure-decrease control shown in FIG. 5 ends, the gentle pressure-increase control shown in FIG. 6 is then executed.

To execute the program of the gentle pressure-increase control for the high $\mu$ road side wheel shown in FIG. 6, a step S14 is executed to judge whether or not the control for decreasing the hydraulic braking pressure to the low $\mu$ road side wheel ends and the brake pressure control is in the hold mode. If the hold mode is set up, a step S15 is executed to turn OFF the decay valve associated with the high $\mu$ road side wheel and turn ON the hold valve associated therewith, and to place the brake pressure control for the same wheel to the hold mode. A step S16 then is executed to judge whether or not a state that the brake pressure control to the high $\mu$ road side wheel is in the hold mode continues for a time over the predetermined time T. That is, this step checks if the predetermined time T in FIG. 2 elapses.

If the time T elapses, a step S17 is executed to judge whether or not the control for the low $\mu$ road side wheel terminates. If it terminated, a step S18 is executed to terminate the control for the high $\mu$ road side wheel, and the forcible pressure-decrease control for the high $\mu$ road side wheel ends in its execution.

If the control for the low $\mu$ road side wheel is not yet terminated (step S17), a step S19 is executed to judge whether or not a gentle pressure-increase control start flag is in an OFF state. If it is OFF, a step S20 is executed to set that flag ON; a step S21 resets a preset gentle pressure-increase time to an initial value; a step S22 starts the gentle pressure-increase control; and a step S23 turns OFF the decay valve and turns OFF the hold valve within the predetermined time.

If the gentle pressure-increase control needs to be further continued after the end of the step S23, the step S19 is executed again. In this step, if the gentle pressure-increase control start flag is ON, a step S24 is executed to judge whether or not a gentle pressure-increasing cycle time t0 terminates. The gentle pressure-increasing cycle time t0 is set in advance.

If the time t0 terminated (step S24), a step S25 is executed to judge the relation given by the following expression, viz., whether or not the present gentle pressure-increasing cycle time t1 exceeds a preset value $t_{lim}$ (limiter).

Present gentle pressure-increasing cycle time t1 $\geq$ preset value $t_{lim}$ (limiter)

The preset value $t_{lim}$ (limiter) is previously set within the gentle pressure-increasing cycle time t0.

If it does not yet reach the preset value $t_{lim}$, a step S26 is executed to calculate the next gentle pressure-increasing cycle time t2 by use of the following equation (3). A step S27 is executed to turn OFF the decay valve and the hold valve within the predetermined time and to execute the gentle pressure-increase control.

Next gentle pressure-increasing time t2=present gentle pressure-increasing time t1+preset value ΔT (3)

This control will be further described. As shown in FIG. 5, the OFF time of the decay valve and that of the hold valve are progressively increased within the gentle pressure-increasing cycle time t0.

If the gentle pressure-increasing cycle time is reached (the gentle pressure-increasing time t1 reaches the preset value (limiter), a step S28 is executed to judge whether or not a preset deceleration occurs in the pseudo-vehicle speed Vv. If the answer is YES (deceleration occurs), a step S29 is executed to place the hydraulic braking pressure control for the high $\mu$ road side wheel to the pressure decreasing mode. If the preset deceleration does not occur in the pseudo-vehicle speed, the "antilock control procedure" returns to the start in its execution, and executes the control of the FIG. 6 flow chart again.

If the gentle pressure-increasing cycle time is reached (present gentle pressure-increasing time t1 reaches the preset value (limiter) (step S25), a step S28 is executed to judge whether or not a preset deceleration occurs in the pseudo-vehicle speed. If the answer is YES, a step S28 is executed to place the hydraulic braking pressure control for the high $\mu$ road side wheel to the pressure decreasing mode. If the answer is NO, a step S30 is executed to place the hydraulic braking pressure control for the high $\mu$ road side wheel to the pressure increasing mode (yaw moment control), and here the gentle pressure increase control is completed.

If the pressure decreasing control for the low $\mu$ road side wheel terminates and is not in the hold mode (step S14), and if the hold mode of the high $\mu$ road side wheel continues for a time shorter than the predetermined time T (step S16), the "antilock control procedure" returns to the start of the control program, and the gentle pressure increase control is executed again.

If the preset deceleration occurs in the pseudo-vehicle speed (step S28), the pressure control for the high $\mu$ road side wheel is placed to the pressure decreasing mode (yaw moment control), and the current gentle pressure increase control ends.

In the antilock control method, wherein during the running of an automotive vehicle on a road surface ($\mu$-split surface) having a different coefficient of friction where one of the right and left wheels of the same axle is on a road surface of the higher coefficient of friction and the other one of the wheels is on a road surface of the lower coefficient of friction, when the brake is operated and the decreasing of the brake pressure to the right and left wheels starts, and the wheel that runs on the road surface having the lower coefficient of friction excessively slips, 1) a forcible pressure-decreasing time of the wheel that runs on the road surface having the higher coefficient of friction is progressively changed every period, to thereby reduce an excessive pressure decrease, and
2) the start of the gentle pressure increase control for the wheel that runs on the road surface having the higher coefficient of friction is quickened, whereby the antilock control method can efficiently utilize the braking force to the wheel on the high $\mu$ road surface, to thereby eliminating the insufficient deceleration problem.

As seen from the foregoing description, the invention reduces an excessive pressure decreasing by changing the forcible pressure-decrease value for the high $\mu$ road side wheel every period. Further, the efficiency of utilization of the high $\mu$ road surface is improved by quickening the starting time of the gentle pressure increase control. A limiter is used for the pressure increasing rate, to thereby prevent an excessive increase of the hydraulic braking pressure to the high $\mu$ road side wheel which occurs when the gentle pressure increase control is performed and hence to suppress an excessive difference of braking force between the right and left wheels. Further, in the forcible pressure-decrease control for the high $\mu$ road side wheel which is performed in linking with the low $\mu$ road side wheel, the invention can eliminate the insufficient deceleration, which is caused by the forcible pressure decreasing for the high $\mu$ road side wheel, while being free from a slip time of the low μ road side wheel. Therefore, the braking force to the wheels can effectively used under every road conditions, and a stable vehicle running is secured.

What is claimed is:

1. An antilock control method for use during the running of an automotive vehicle on a road surface having different coefficients of friction where one of the right and left wheels of the same axle is on a road surface of a higher coefficient of friction and the other one of said wheels is on a road surface of a lower coefficient of function, said method including the steps of:

1) progressively decreasing a hydraulic braking pressure applied to the wheel that runs on the road surface having the higher coefficient of friction during progressively decreasing periods of time, wherein time periods between the progressively decreasing periods of time progressively increase, and 2) after progressively decreasing the hydraulic braking pressure, a gentle increasing of the hydraulic braking pressure to the wheel that runs on the road surface having the higher coefficient of friction starts, whereby the road surface having the higher coefficient of friction is efficiently utilized, thereby eliminating insufficient deceleration of the vehicle body.

2. The antilock control method according to claim 1, wherein said step of progressively decreasing the hydraulic braking pressure is performed provided that the following conditions are all satisfied:

a) the antilock control is in its first cycle, b) the wheel on a road surface of a higher coefficient of friction is not in a pressure decreasing mode, c) the speed of the wheel on a road surface of a higher coefficient of friction has never decreased to below a predetermined threshold value VT2, and d) the speed of the wheel on a road surface of a lower coefficient of friction is below the threshold value VT2 and is in a pressure decreasing mode.

3. The antilock control method according to claim 1 or 2, wherein said step of gentle increasing of the hydraulic braking pressure is performed if either of the following conditions is satisfied:

a) a predetermined time elapses in a state that the wheel on a road surface of a higher coefficient of friction is in a hold mode following the end of the step of progressively decreasing the hydraulic braking pressure, and b) a pressure increasing mode is set up for the wheel on a road surface of a lower coefficient of friction within a predetermined time (T).

* * * * *